Figure 1:
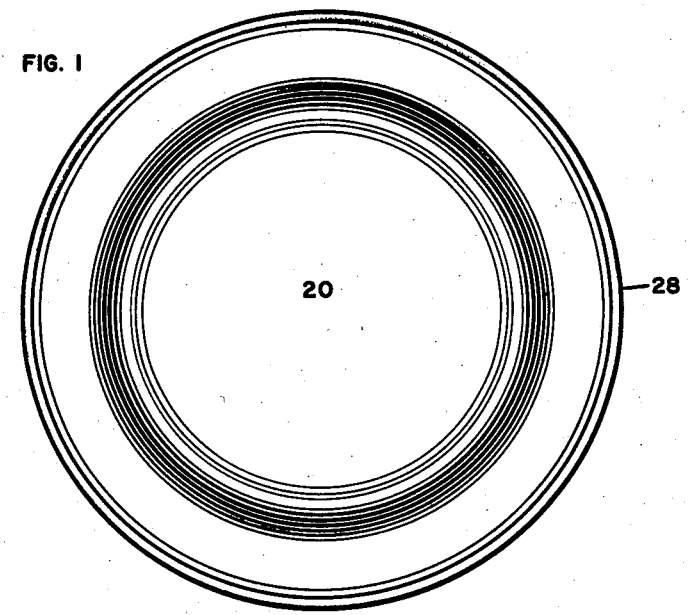
Figure 2:
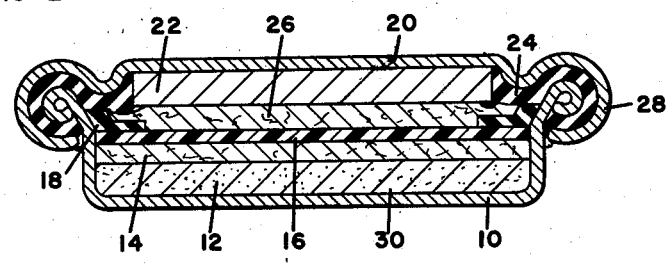

March 25, 1958     J. W. RHYNE, JR     2,828,350

SODIUM BISMUTHATE CELL

Filed Oct. 3, 1956

INVENTOR
John W. Rhyne, Jr.

BY

ATTORNEY

United States Patent Office 2,828,350
Patented Mar. 25, 1958

2,828,350

SODIUM BISMUTHATE CELL

John W. Rhyne, Jr., Lancaster County, Pa., assignor to Hamilton Watch Company, Lancaster, Pa., a corporation of Pennsylvania Application October 3, 1956, Serial No. 613,651

4 Claims. (Cl. 136—102)

This invention relates to electric current producing cells and more particularly relates to alkaline dry cells.

It is an object of the present invention to provide improved cells of the foregoing type.

It is another object of the invention to provide an improved alkaline dry cell having a cathode depolarizer which comprises sodium bismuthate.

These and further objects and advantages of the invention will become more apparent upon reference to the following specification and claims and appended drawing which shows a disc type dry cell constructed according to the invention.

The basic principles of a galvanic cell is the utilization of an oxidation-reduction reaction to produce a flow of electrons through a conductive circuit. The process of oxidation is one by which the positive valence of an element is increased or, in terms of electronic charges in the configuration of the atom consumed, electrons are lost. Reduction is defined as a process by which the positive valence is decreased or electrons are gained by the atom or ion in question. Reduction is the reverse of oxidation and these processes normally occur simultaneously in such combination that the total number of electrons released in the oxidation reaction is equal to the number gained in the reduction reaction.

In the application of an oxidation-reduction reaction to produce a current in a battery the two half reactions are separated so that the exchange of electrons between the substance being oxidized and that being reduced occurs only when an external conductor is provided between the two substances. This also requires that the two reactants be separated by some medium which will not conduct electronically but will allow free interchange of ions between them. The reason for this is that atoms losing electrons become positively charged and if not removed from the electrode will lend to it a positive charge thereby reducing the tendency of electrons to leave that electrode. A similar situation would exist at the other electrode and this effect is known as polarization. In order to prevent or reduce this phenomenon a depolarizing means is provided to remove or neutralize the charges.

The primary reaction that occurs at the anode is that of oxidation of some substance, usually a metal, to form positive ions and a release of electrons which flow through an external conductor to cause reduction of the cathode material. The reaction, however, in practice is not a simple oxidation reaction and reactions other than those desired generally take place when an attempt is made to produce a satisfactory current producing primary cell. Thus in the case of a cell using a zinc anode and a sodium hydroxide electrolyte, a large number of sequential reactions may occur in which the zinc ion attaches water molecules to it by coordinate-covalent bonds and these groups then react with hydroxide ions to form further complex groups which in turn again react and so on.

The basic reaction which takes place at the cathode is the reduction of the depolarizer by the electrons given off by the anode reaction. Considering $HgO$ in alkaline solution as a particular case, a sequence of reactions may be postulated as the mechanism of reaction.

$$HgO + 2e \rightleftharpoons Hg + O^=$$
$$O^= + H_2O \rightleftharpoons 2OH^-$$

The rate of reaction is governed by the second reaction, even though the reaction constant for this reaction is considered to be greater than $10^{22}$ since in very concentrated electrolytes the $OH^-$ concentration is high and the water tied up is water of hydration for the alkaline metal ion.

There are certain other reactions which may occur at the cathode that may be classified as secondary reactions. These are as follows:

(1) Solubility of the depolarizer in the electrolyte. Mercuric oxide is slightly soluble in alkaline solution and if the ion thus formed is transported through the cell it reacts with the zinc and causes the zinc and the depolarizer to be depleted faster than usual without giving any useful electrical energy.

(2) Formation of hydrogen gas at the cathode at high rates of drain. This is simply a case of the anode secondary cell action taking place on the metal electrode due to the limitations of the ability of the depolarizer to react at a high enough rate.

While most alkaline cells have utilized oxides, peroxides, or permanganates as depolarizing materials, we have now found that a highly satisfactory alkaline cell may be constructed utilizing sodium bismuthate $$(NaBiO_3)$$

as a depolarizer cathode. The sodium bismuthate is relatively insoluble in alkaline solution and possesses a higher reaction potential than mercuric oxide. As a result the secondary reaction normally encountered with mercuric oxide (as set out in paragraph 1 hereinabove) is markedly diminished, and the formation of hydrogen gas (as set out in paragraph 2 hereinabove) is minimized. The depolarizer is preferably comprised of a consolidated mass of such material and may have graphite interspersed therein in order to provide additional conductivity.

Referring to the drawing there is shown one embodiment of the invention wherein the cell comprises a wafer type cell described in detail in assignee's copending application Serial No. 558,151, filed January 9, 1956. This cell consists of a cathode container 10 containing a consolidated mass of sodium bismuthate which may have a small amount of graphite mixed therewith to increase the conductivity thereof. Over the cathode depolarizer there is disposed a layer or disc of absorbent material 14 of porous paper or similar unreactive absorbing material. This porous material carries the electrolyte for the cell which may be sodium hydroxide. A barrier 16 which is non-conductive electronically but which allows free interchange of ions therethrough overlies the absorbent material 14 and may consist of an unreactive microporous absorbent material such as that material known in the trade as Synpor (microporous polyvinyl chloride), parchment paper, or other similar unreactive microphorous material. For best results, the barrier 16 may be as described in assignee's copending application Serial No. 558,151. The upper half of the cell comprises an anode container 20 containing an anode 22 which consists of powdered zinc consolidated into a solid mass. This is sealed into position by means of a washer 24. A further layer of porous material 26 saturated with electrolyte covers the barrier 16 and engages the undersurface of the anode 22. The anode and cathode containers are fastened together by crimping the anode container to the cathode container as shown at 28.

The invention may be embodied in other specific forms without departing from the spirit or essential characteristics thereof. The present embodiment is therefore to be considered in all respects as illustrative and not restrictive, the scope of the invention bing indicated by the appended claims rather than by the foregoing description, and all changes which come within the meaning and range of equivalency of the claims are therefore intended to be embraced therein.

What is claimed and desired to be secured by United States Letters Patent is:

1. An alkaline dry cell comprising an anode, an alkaline electrolyte, and a depolarizer cathode consisting essentially of sodium bismuthate.
2. An alkaline dry cell comprising an anode of a powdered metal consolidated into a solid mass, an alkaline electrolyte, and a depolarizer cathode consisting essentially of sodium bismuthate.
3. An alkaline dry cell comprising an anode of powdered zinc consolidated into a solid mass, an alkali metal hydroxide electrolyte, and a depolarizer cathode consisting essentially of sodium bismuthate.
4. An alkaline dry cell comprising an anode of powdered zinc consolidated into a solid mass, an alkali metal hydroxide electrolyte, and a depolarizer cathode consisting essentially of powdered sodium bismuthate compressed into a consolidated mass.

References Cited in the file of this patent

UNITED STATES PATENTS 1,195,677   Heil ----------------- Aug. 22, 1916